Figure 1:
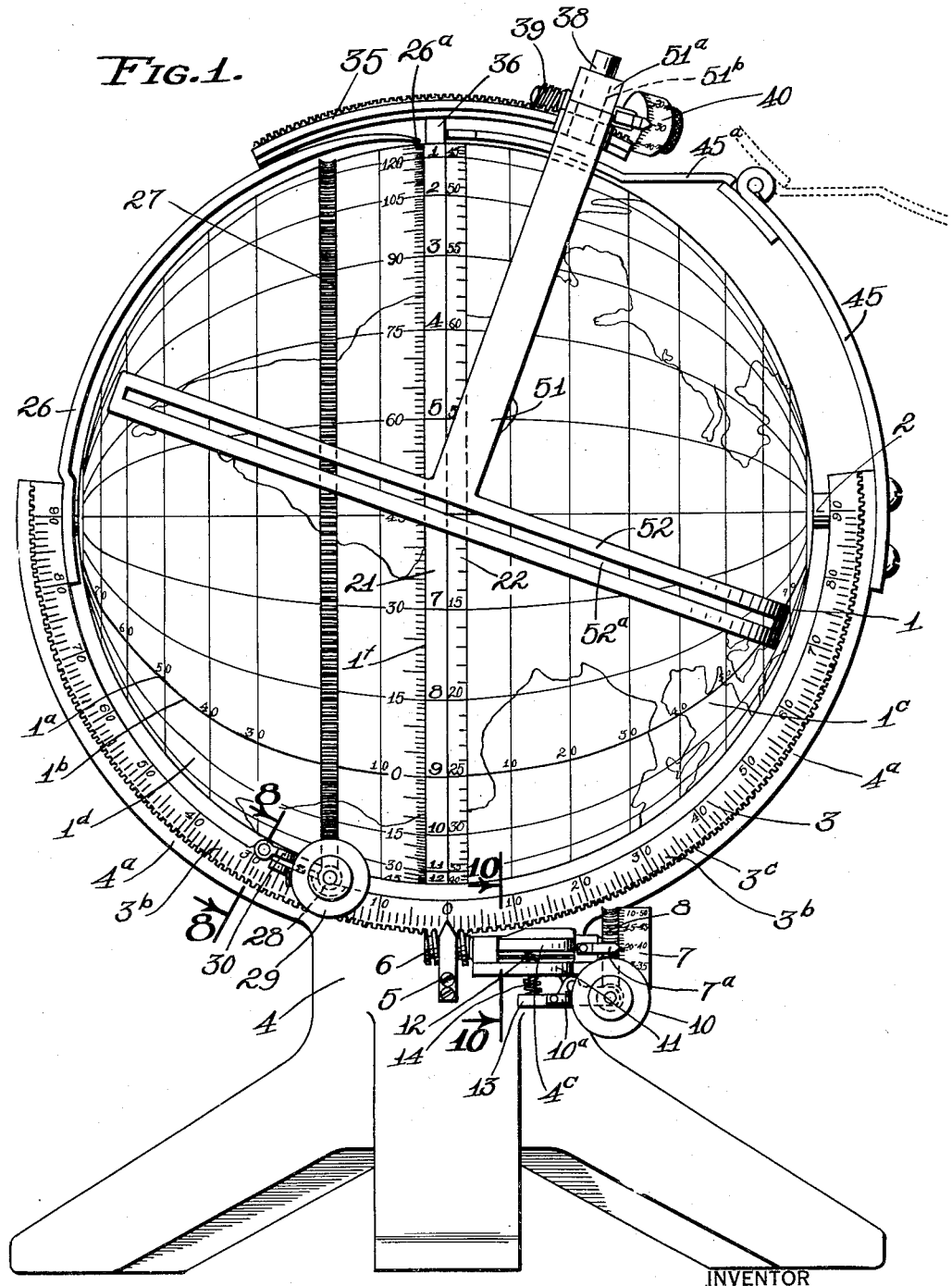

March 6, 1934.   E. H. ASHLOCK   1,949,403
NAVIGATION INSTRUMENT
Filed Dec. 8, 1931   5 Sheets-Sheet 3

INVENTOR
ERNEST H. ASHLOCK
BY
A. B. Bowman
ATTORNEY

March 6, 1934.  E. H. ASHLOCK  1,949,403
NAVIGATION INSTRUMENT
Filed Dec. 8, 1931  5 Sheets-Sheet 4
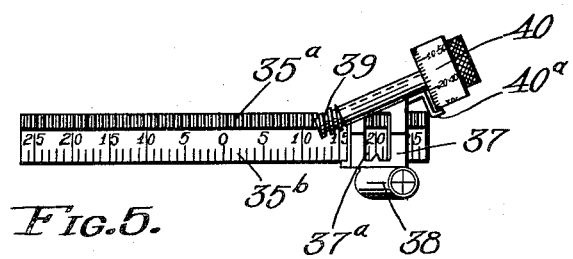
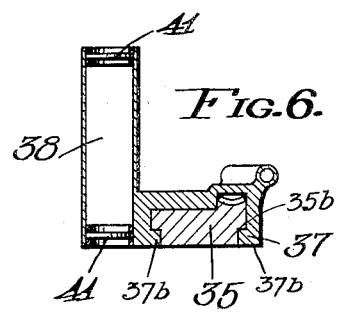
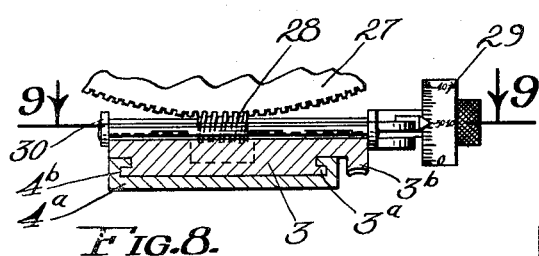
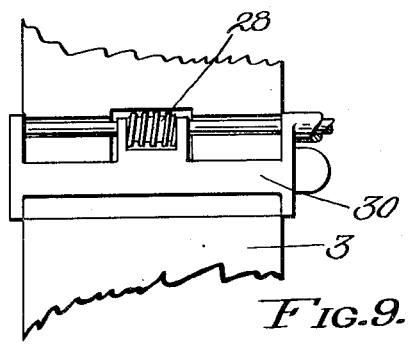
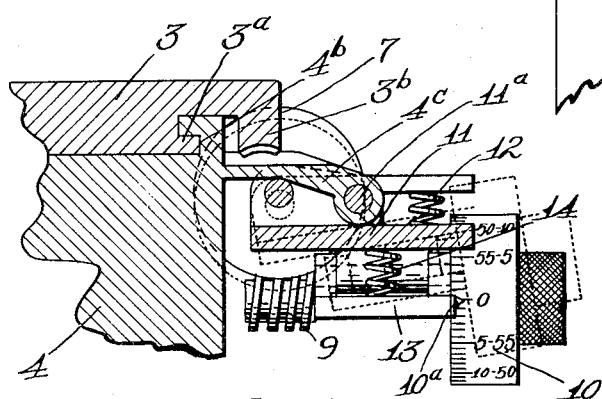
INVENTOR
ERNEST H. ASHLOCK
BY
A. B. Bowman
ATTORNEY March 6, 1934.  E. H. ASHLOCK  1,949,403
NAVIGATION INSTRUMENT
Filed Dec. 8, 1931  5 Sheets-Sheet 5
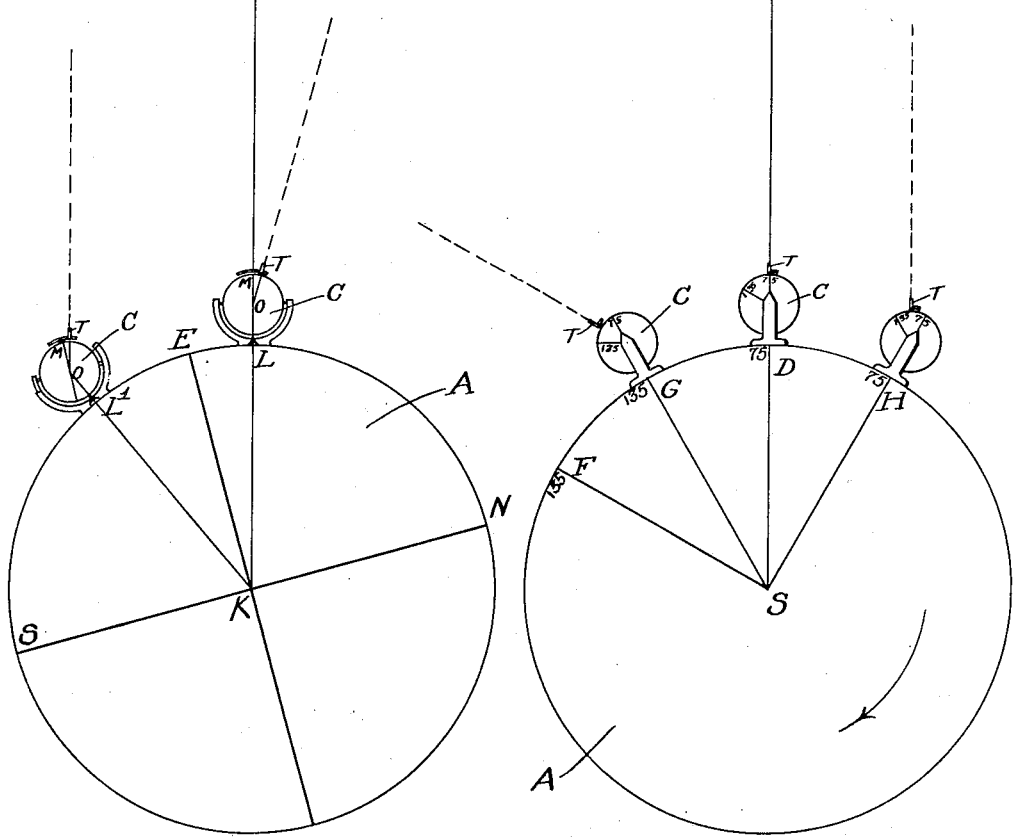
INVENTOR
ERNEST H. ASHLOCK
BY
A. B. Bowman
ATTORNEY Patented Mar. 6, 1934

1,949,403

UNITED STATES PATENT OFFICE 1,949,403

NAVIGATION INSTRUMENT

Ernest H. Ashlock, San Diego, Calif.

Application December 8, 1931, Serial No. 579,720

14 Claims. (Cl. 33—61)

My invention relates to navigation apparatus and more particularly to such apparatus for use in determining the latitude and longitude location of crafts.

The objects of my invention are:

First, to provide a device of this class in the form of a globe, thereby providing a map of the world in conjunction with the apparatus;

Second, to provide a device of this class which is equally applicable to land, air or water navigation or travel;

Third, to provide a device of this class whereby the latitude and longitude of the location are read directly upon scales without the usual computations or use of charts;

Fourth, to provide a device of this class having an indicator member thereon which indicates upon the globe the location of the instrument upon the earth;

Fifth, to provide a device of this class having a novel arrangement of scales for reading directly the latitude and longitude location of the instrument upon the earth;

Sixth, to provide a novel clock arrangement within the globe thereby eliminating the use of an auxiliary clock;

Seventh, to provide a novel dial arrangement in combination with the globe whereby the time at any meridian may be read directly;

Eighth, to provide a novel telescope for use in determining the direct position of the sun;

Ninth, to provide novel means in combination with the telescope for compensating for the sun's declination;

Tenth, to provide a novel mounting for the telescope whereby the telescope is automatically moved in accordance with the apparent movement of the sun;

Eleventh, to provide a device in combination with the globe whereby the time of sunrise or sunset at any point on the earth is readily determined by simple observation;

Twelfth, to provide a novel mounting for the device whereby the same may be readily removed from the globe when desired;

Thirteenth, to provide a novel device in combination with the globe whereby the point or points on the earth at which the sun is rising or setting is readily observable at any instance of time;

Fourteenth, to provide a novel device in combination with the globe whereby the length of day and night may be easily determined for any position or latitude of the earth by means of simple observation and simple calculation;

Fifteenth, to provide a novel mounting for the globe and clock works whereby the globe may be revolved upon its longitudinal axis without interfering with the relative position of the clock dial and the meridian lines; and Sixteenth, to provide a device of this class that is simple and economical of construction in comparison with the function performed thereby, and one which will not readily deteriorate or get out of order.

Figure 2:
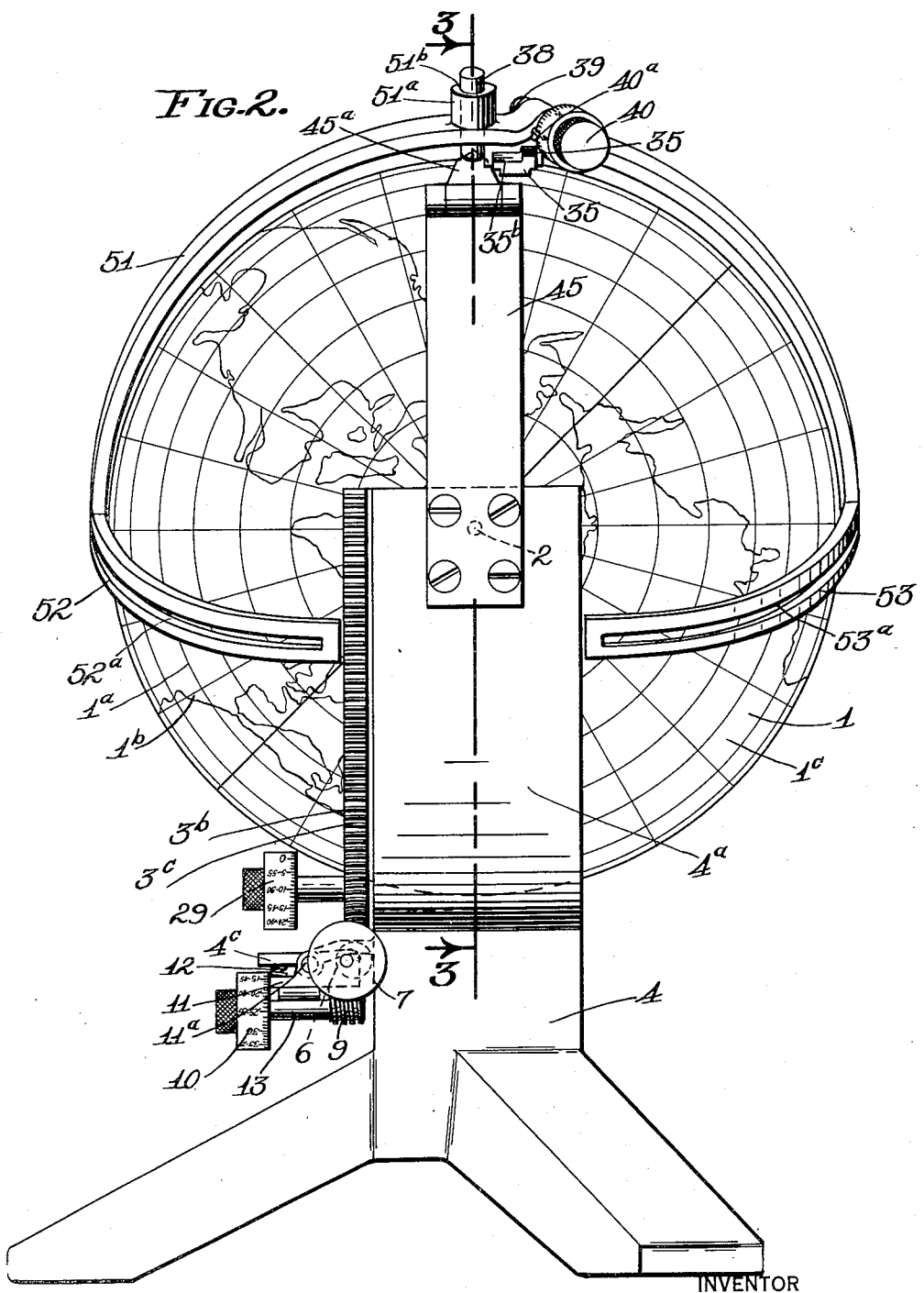
Figure 3:
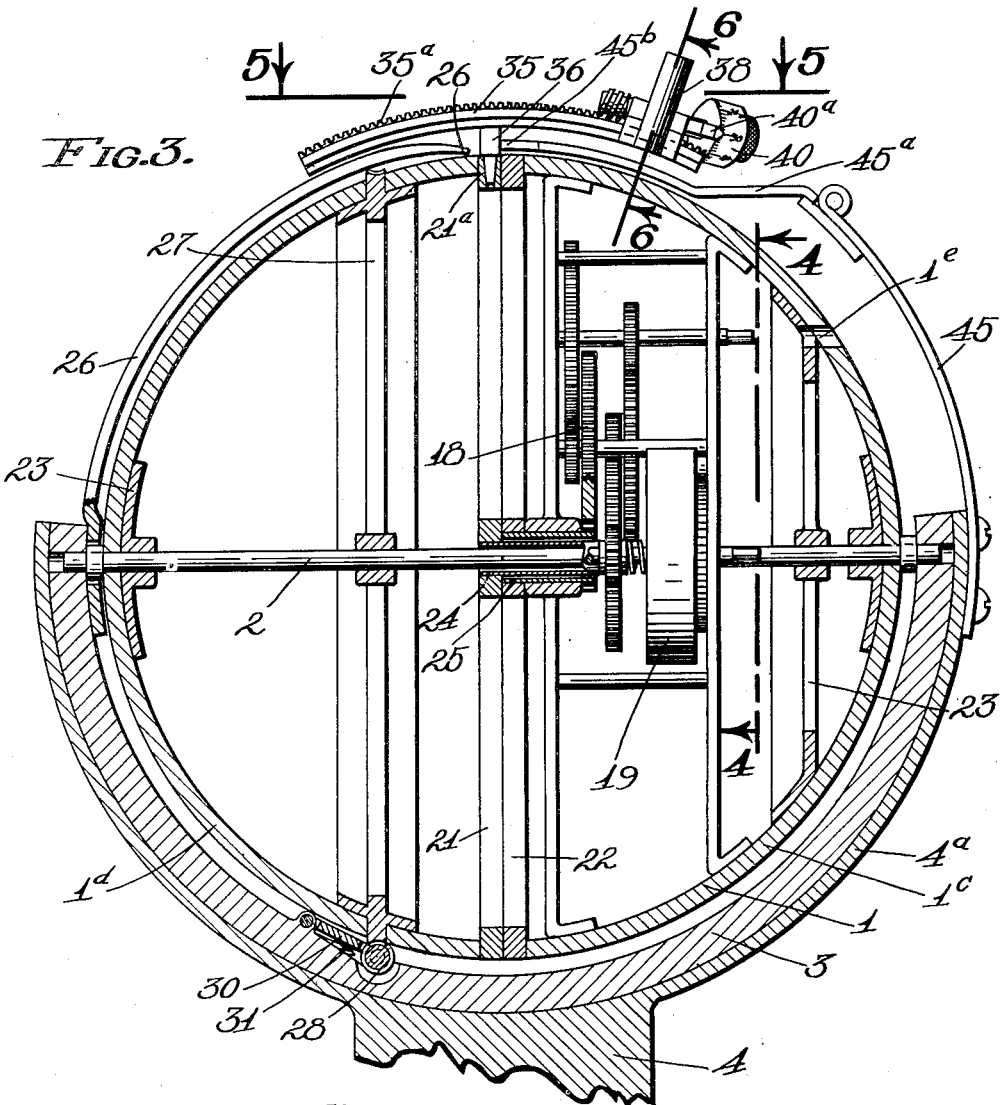
Figure 4:
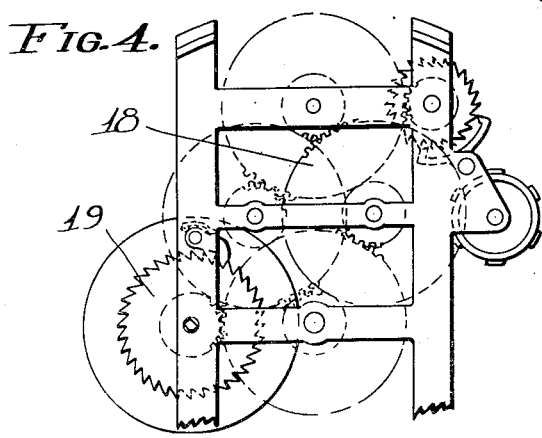

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a longitudinal side elevational view of my apparatus; Fig. 2 is an end elevational view thereof, looking at the North Pole end of the apparatus; Fig. 3 is a longitudinal sectional elevational view thereof taken at 3—3 of Fig. 2; Fig. 4 is an end elevational view of the clock mechanism taken at 4—4 of Fig. 3; Fig. 5 is a plan view of the telescope and its mounting, taken at 5—5 of Fig. 3; Fig. 6 is a transverse sectional elevational view of the telescope and its mounting taken at 6—6 of Fig. 3; Fig. 7 is an end view of the telescope; Fig. 8 is a transverse sectional elevational view taken at 8—8 of Fig. 1; Fig. 9 is a plan view of the apparatus shown in Fig. 8 being taken at 9—9 of Fig. 8; Fig. 10 is a transverse sectional elevational view taken at 10—10 of Fig. 1; Fig. 11 is a diagrammatic illustration showing the earth and the sun and the location of the instrument relative thereto when determining latitudes; Fig. 12 is a diagrammatic illustration of the earth and sun and showing the relative position of the instrument when determining longitudes.

Like characters of reference refer to similar parts and portions throughout the views of the drawings.

The globe 1, which is similar to an ordinary geography globe having latitude lines 1a and longitude lines 1b, but is in this instance preferably made of a non-corrodible metal, is mounted upon its polar or longitudinal axis 2 and is rotatably supported within an arcuate member 3 of slightly greater than semi-circular extent. The arcuate member 3 is in turn rotatably supported on the base 4 within the yoke portion 4a thereof. The yoke portion 4a is provided with grooves 4b (Fig. 8) into which extend a similar tongue 3a of the arcuate member 3 for retaining the ring in position at the same time permitting rotatable movement thereof relative to the base. One edge of the arcuate member 3 extends outwardly and downwardly over the corresponding edge of the yoke 4a of the base 4. The outwardly and downwardly extending portion, designated 3b, is provided on its outer face with latitude scales, the said face being divided into degrees extending ninety degrees in each direction from zero. The portion of the scale on the right referring to Fig. 1, designated 3c, is used in reading latitudes in the Northern Hemisphere, while the portion of the scale on the left of the zero mark, designated 3d, is used in reading latitudes in the Southern Hemisphere. A pointer 5 is secured to the base 4 and is so positioned that when the device is supported upon a horizontal surface and the plane of the equator of the globe is vertical, the zero position of the latitude scales coincides with the point of the pointer. Since it is necessary to read the latitude scales to fractions of a degree the lower edge of the portion 3b of the arcuate member 3 is cut as a worm wheel 3c, there being one tooth per degree of arc. Meshing with the worm wheel 3c is a worm 6 one revolution of which moves the arcuate member 3 through one degree. This worm wheel is mounted upon a shaft supporting a dial 7 which dial is divided into sixty divisions. Since there are sixty minutes to a degree and since one complete revolution of the dial 7 moves the arcuate member 3 one degree, each division of the dial corresponds to one minute of the arcuate member 3. To provide still finer readings, the dial 7 is provided with a worm wheel 8 which is engaged by a worm 9 having a dial 10 rigidly secured thereto. The graduations upon the dial 10 are in accordance with the number of divisions through which the dial 7 is moved by one revolution of the dial 10. It will be noted that the graduations on each of the dials 7 and 10 are identified by two sets of numbers which sets of numbers increase consecutively in opposite directions, one set of numbers being used for reading north latitudes and the other set for south latitudes. In order to permit the globe 1 together with the arcuate member 3 to be rotated without the use of the dials 7 and 10, as would be the case where large movement is desired, the dial 7 together with its corresponding worm 6 is supported upon a bracket 11. The bracket 11 is in turn pivotally supported by a pin 11a upon an outwardly extending bracket 4c of the base 4. Because of the pivotal supporting of the bracket 11 the worm 6 may readily be disengaged from the worm wheel 3e, the worm 6 being normally held in engagement with the worm wheel 3e by means of a coil spring 12. Similarly the dial 10 and worm 9 are supported upon a bracket 13 which is pivotally supported by the bracket 11, thereby permitting the worm 9 to be disengaged from the worm wheel 8 of the dial 7 permitting turning of the dial 7 independently of the dial 10. The worm 9 is held normally in engagement with the worm wheel 8 by means of a coil spring 14.

The globe 1 is distinctly divided into a Northern Hemisphere 1c and a Southern Hemisphere 1d by the clock dials 21 and 22, the adjacent edges of the dials representing the equator of the globe 1. The respective hemispheres are well supported upon the shaft 2 by suitable brackets 23 (Fig. 3). The dial 21 is the hour dial and is divided into twenty-four equally spaced parts, the divisions being numbered from one to twelve. The dial is thus divided into two portions each portion being numbered consecutively from one to twelve, one portion indicating A. M. time and the other portion indicating P. M. time, each separate portion being plainly marked to avoid confusion. The dial 22 is the minute dial and is divided into two distinct portions, each portion being numbered from one to sixty, the dial 22 rotating twelve times as rapidly as the dial 21. Since the dials 21 and 22 are continually rotating with respect to the globe 1 and since the globe is divided into meridian lines spaced fifteen degrees apart, which corresponds to one hour in time, the time at any meridian is readily determined by noting the position of the dials 21 and 22 with respect to that meridian. The dial 21 is supported upon a tubular shaft 24 while the dial 22 is similarly supported upon a tubular shaft 25 positioned coaxial with the shaft 24. The shafts 24 and 25 are operatively connected together by means of a gear train 18 of such ratio as to give the desired relative speed of the two dials 21 and 22. The gear train 18 is driven by a suitable clock mechanism 19 of a conventional construction. The clock mechanism 19 is rigidly supported within and by the globe 1 and non-rotatable relative thereto. The globe 1 is provided with openings 1e (Fig. 3) through which a key may be inserted for winding and setting the clock mechanism and dials. It will be noted that the clock mechanism 27 is so mounted that the dials 21 and 22 are continually revolved with respect to the globe 1 at the same time permitting the globe to be revolved upon its polar axis 2 without changing the position of the dials with respect to the meridian lines.

The Southern Hemisphere 1d of the globe 1, adjacent the dial 21, is graduated into degrees, designating degrees of longitude, the graduations being designated 1f. A pointer 26 is rigidly secured to the arcuate member 3 and extends circumferentially over the Southern Hemisphere 1b of the globe 1 terminating with its point 26a over the graduated scale 1d and vertically above the polar axis 2. This pointer is adapted for reading the longitude that occupies the position vertically above the polar axis 2. Since in determining longitude it is necessary to read fractions of degrees I have provided a worm wheel 27 positioned with its plane at right angles to the polar axis 2 and preferably at one of the latitude lines 1a. The worm wheel 27 is provided with three hundred and sixty teeth, that is one tooth for each degree of longitude. Meshing with the worm wheel 27 is a worm 28. The worm 28 is secured to a shaft which carries a dial 29 upon its extended end. The dial 29 is graduated or divided into sixty divisions similar to the dial 7. Thus when the dial 29 is rotated one revolution the globe 1 will be rotated through one degree of longitude, as indicated by the pointer 26a. It is therefore seen that each division of the dial 29 corresponds to one minute of arc of rotation of the globe 1 on its polar axis for the reasons set forth in the explanation of the dial 7. In order to permit rotation of the globe 1 about its polar axis without the use of the dial 29 the worm 28 together with its shaft and dial 29 are supported upon a pivotally mounted bracket 30 as shown best in Figs. 3, 8 and 9. By so mounting the worm and dial the worm 28 may readily be disengaged from the worm wheel 27 permitting rapid rotation of the globe 1 in any suitable manner. The worm 28 is normally held in engagement with the worm wheel 27 by means of a spring 31.

Spaced from the globe 1 and extending with its longitudinal extent parallel with the polar axis 2 is an arcuate band 35. The band 35 is supported intermediate its end upon a supporting post 36. The lower end of the supporting post 36 is in the form of a pyramid and is adapted to extend into a socket 21a in the hour dial 21. The band 35 is thus continually rotated with respect to the globe 1 by the clock mechanism 19. By so mounting the band 35 the band may be readily removed from the dial 21 together with its associated apparatus, to be hereinafter described, that is supported thereon, thereby permitting free rotation of the hour dial 21. A portion of the outer surface of the band 35 is formed as an arc of worm wheel having teeth 35a spaced at one degree intervals. The remaining portion of the outer surface is provided with a scale, designated 35b, of degrees. The zero position of this scale is intermediate the ends of the bands, that is in the plane of the equator of the globe 1, the scale being numbered in opposite directions therefrom corresponding to the portion of the band 35 extending over the Northern Hemisphere of the globe in the one instance and the portion extending over the Southern Hemisphere in the other instance. Slidably mounted upon the band 35 is a shoe 37, carrying a telescope 38, the shoe being retained on the band by lugs 37b which engage shoulders 35b at the opposite edges of the band 35. It will be here noted that the socket 21a is so positioned in the dial 21 that a line representing the longitudinal axis of the telescope strikes the surface of the globe on a line joining the poles of the globe and passing through the 12 o'clock noon position on the dial 21 because a line joining the center of the globe and the sun strikes the surface of the globe on this line, as will be apparent in the explanation hereinafter. The shoe 37 also carries a worm 39 and dial 40. The worm 39 is adapted to mesh with the teeth 35a for accurately positioning the telescope upon the band 35, the position of the telescope in degrees being read directly upon the band from the scale 35b through the opening 37a in the shoe 37 while the position in minutes is read from the scale upon the dial 40 as indicated by the pointer 40a. It is not believed necessary to describe the graduations of the dial 40 as they are substantially the same as those of the dials previously explained. The telescope 38 is adapted to be pointed directly toward the sun and since the sun's apparent position with respect to the equator varies from time to time, this being known as the declination of the sun, and since such variations influence the latitude observations, it is necessary that the telescope be positioned north or south of the equator according to the sun's declination at the time of observation. It is for this reason that the telescope 38 is so mounted upon the arcuate band 35.

The telescope in this instance consists of a tubular member 38, provided at its opposite ends with transparent discs 41. Each of these discs is provided with cross hairs or cross lines 41a, the lines being so positioned within the tube that when the sun's rays pass exactly longitudinally through the telescope the shadows of the respective cross hairs upon the surface of the globe 1 will be coincident. The requirement that the sun's rays shine longitudinally through the telescope is an essential requirement to the satisfactory operation of the apparatus, as will be hereinafter described. It will be noted that the telescope here described does not contain lenses. It is however noted that if lenses are employed a sharper image of the shadows of the cross hairs upon the globe would result, thereby making for greater accuracy. A pointer 45 is secured to the yoke 4a of the base 4. This pointer is hinged or broken intermediate its ends so that the portion 45a thereof which extends beneath the arcuate band 35 may be hinged outwardly as indicated by dotted lines in Fig. 1. The pointer end 45b of the pointer 45 is positioned vertically above the center of the globe 1 and remains in such position regardless of the shifting of the globe about its axes. The pointer end 45b indicates the exact location of the instrument upon the earth when the telescope is alined or pointed toward the sun as hereinafter described.

Detachably carried or supported by the telescope 38 is a sunrise and sunset indicating device consisting of a semi-circular band 51 having at its lower ends additional semi-circular bands or index members 52 and 53. The semi-circular band 51 is provided intermediate its ends with a radially outwardly extending boss 51a having a central bore 51b therethrough. The bore 51b is adapted to fit over the outside of the telescope 38 for detachably supporting the sunrise and sunset indicating device thereon. The semi-circular bands 52 and 53 are rigidly secured to, or may be made a part of, the band 51, and are positioned with their longitudinal extent perpendicular to the band 51. The semi-circular band 52 represents the Eastern Hemisphere with respect to the telescope 38 while the semi-circular band 53 represents the Western Hemisphere with respect to the telescope 38. It is thus obvious that the band 52 will be used in determining points of sunset while the band 53 will be used in determining points of sunrise. The bands 52 and 53 are each provided with longitudinally extending slots 52a and 53a, respectively. The lower edge of the slots 52a and 53a lie in a plane perpendicular to the longitudinal axis of the telescope 38 and pass through the center of the globe 1. It is thus obvious that the lower edge of the respective slots 52a and 53a is the index line of the semi-circular bands 52 and 53. The lower edges of these slots mark an imaginary line upon the surface of the globe 1, in their respective hemispheres, which lines pass through points on the surface of the globe 1, which points correspond to the points on the surface of the earth at which the sun is rising or setting. Whether the sun is rising or setting at the points being observed depends upon which band the observations are being taken from, that is, the band 52 or the band 53.

The operation of the device in determining sunrise and sunset is believed to be apparent when it is remembered that the telescope 38 is carried by the hour dial 21 and is so positioned on the hour dial 21 that the telescope 38 is always in a position with respect to the surface of the globe 1, that the sun is to the earth. Since points on the earth of sunrise and sunset lie in a plane perpendicular to a line joining the center of the earth and the sun and pass through the center of the earth, it is obvious that the lower edge of the slot 52a and 53a will indicate points of sunset and sunrise since the lower edges of these respective slots lie in a plane passing through the center of the globe and perpendicular to the longitudinal axis of the telescope 38, which plane corresponds to the plane referred to on the earth proper. To determine the length of day or night for any given latitude, it is merely necessary to measure the number of degrees of arc along the latitude at which the length of day and night is to be determined between the lower edge of the slot 52a and of the slot 53a, the length of day being the number of degrees when measured through the portion of the globe occupied by the telescope 38, and the length of night being the number of degrees measured through the remaining portion of the globe. The above determinations of the length of day and night have been given in terms of degrees. It is therefore necessary to convert the degrees into time in terms of hours and minutes which operation is a relatively simple matter since 15° of longitude represents 1 hour in time.

In using the instrument for determining latitude and longitude the base 4 is supported upon a horizontal surface, or in the case of water craft in such a way that the base is maintained in a horizontal plane. The telescope 38 is then positioned upon the arcuate band 35 according to the sun's declination at the particular time of observation. The sun's declination is readily obtained from nautical almanacs which are found aboard water craft as well as in many other places. With the telescope 38 properly positioned on the band 35 the band is inserted into the socket 21a of the hour dial 21. The globe 1 is then rotated about its polar axis 2 and the polar axis is inclined by rotating the arcuate member 3 simultaneously with the rotating of the globe about its polar axis until the sun's rays pass longitudinally through the telescope 38, this condition being indicated when the shadows of the cross hairs 41a at the opposite ends of the telescope 38 are coincident. When this condition is obtained the latitude is read directly upon the scales 3b or 3c, and the dials 7 and 10 depending upon whether it is north or south of the equator, and the longitude is indicated by the pointer 26a, the minutes of longitude being read by the dial 29. When the above mentioned condition is obtained the point of the pointer 45 will indicate upon the map printed on the globe 1 the location of the instrument upon the earth. The operation of the device may be more clearly understood by referring to Figs. 11 and 12.

Referring to Fig. 11 the operation of the device in determining latitude may be explained as follows: The figure is a diagrammatic representation of the earth designated A and having its polar axis designated by the line N. S., indicating north and south respectively, inclined, in this instance, at an angle of fifteen degrees such inclination varying with the time of year. Since it is the tilting of the earth's polar axis which causes the sun's declination a line from the sun B to the center of the earth A will strike the surface of the earth at the point L, making an angle of fifteen degrees with the equator E of the earth which is the angle of the sun's declination. Considering the instrument, designated C, as positioned at the point L, which is the latitude of the point where the sun's rays are normal to the earth's surface which point equals the sun's declination, and considering that the polar axis of the instrument is horizontal, that is, that the latitude scale is at zero, and further considering the telescope is positioned fifteen degrees north of the equator of the instrument, which corresponds to the sun's declination, the angle M. O. T., that is the angle between the equator of the instrument and the telescope, equals the angle E. K. L. Thus, from the figure it is obvious that in order to point the telescope toward the sun the globe of the instrument C must be rotated, that is, the polar axis of the instrument must be tilted, to an angle of fifteen degrees. When the polar axis of the instrument is so tilted the pointer on the base thereof will indicate fifteen degrees, which as previously pointed out, is the latitude location of the instrument, such latitude having been taken for the purpose of explanation. To further illustrate the operation consider the instrument as positioned below or south of the equator, that is, in the left hand position in Fig. 11. Since the sun's declination is considered to be the same as that previously considered the telescope T occupies a position fifteen degrees north of the equator of the instrument. Thus when the polar axis of the instrument is tilted until the telescope points toward the sun, as here shown, the equator of the instrument will be parallel to the equator of the earth for the reason that the sun is fifteen degrees north of the earth's equator and the telescope of the instrument is fifteen degrees north of the equator of the instrument. When the equator of the instrument is thus made parallel to the equator of the earth the arrow on the base of the instrument indicates the latitude or the location of the instrument at L1. This indication is believed obvious from the plane geometry theorem "that when a line intersects parallel lines (in this instance the equator of the instrument and the equator of the earth) the alternate interior angles are equal." The line here considered being the line L'K which intersects the surface of the earth at the latitude of the instrument C. It will be noted that the dash line indicating the telescope as pointing toward the sun with the instrument located at position L1, is parallel to the line BK. The reason for this being that for all practical purposes lines from various points on the surface of the earth to the sun are substantially parallel. This notation also applies in referring to Fig. 12 hereinafter.

Referring to Fig. 12, the operation of the instrument in determining longitude is as follows: The earth A is here viewed from the South Pole, and when so viewed rotates in a clockwise direction, as indicated by the arrow. Considering the instrument C as positioned on the 75th meridian, and that it is exactly twelve noon, 75th meridian time, since the telescope is carried by the clock dial, the telescope will be directly over the 75th meridian of the instrument at twelve noon. Thus when the globe is rotated about its polar axis until the sun's rays pass longitudinally through the telescope, assuming the polar axis is parallel to the axis of the earth and the telescope is positioned according to the sun's declination, the 75th meridian will be vertical and the pointer will indicate that the instrument is positioned on the 75th meridian of the earth. Now consider that the instrument remains on the 75th meridian of the earth and that two hours time elapses, the earth will rotate through two hours time, that is through thirty degrees, and the 75th meridian will now be in the position designated H. The 75th meridian of the instrument remains in the same position relative to the pointer, but the telescope has been rotated through two hours or thirty degrees by the clock mechanism within the instrument so that the telescope still points toward the sun. It is thus seen that when the instrument remains in a fixed position and the pointer indicates such position, the telescope always points toward the sun. Now consider that instead of remaining at the 75th meridian of the earth when the 75th meridian was at the position D, we move the instrument to the 135th meridian of the earth and that the time required for such movement is two hours. During the two hours required to move the instrument from the 75th meridian to the 135th meridian, the 135th meridian has shifted from the position F to the position G. The instrument is then placed on the 135th meridian. The pointer still indicates the 75th meridian of the instrument because the globe has not been rotated upon its polar axis during the movement of the instrument from the 75th meridian to the 135th meridian. In traversing from the 75th meridian to the 135th meridian, the globe has in reality been rotated through sixty degrees, but the rotation of the earth during the two hours has counteracted this rotation relative to the sun by thirty degrees so that the 75th meridian of the instrument is now only thirty degrees off of a line toward the sun. During the two hours, however, the telescope has been rotated through thirty degrees so that the telescope is sixty degrees away from a line toward the sun. It is thus obvious that to again point the telescope toward the sun the globe must be rotated four hours or sixty degrees bringing the 135th meridian of the instrument to the pointer and placing the 75th meridian of the instrument in the same relative position as it would have occupied had the instrument not been moved. Since this position is parallel with the respective meridian of the earth the pointer indicates the longitude of the instrument upon the earth. The operation of the device may further be briefly explained from the standpoint that the telescope always occupies a position relative to any given meridian of the instrument that the corresponding meridian of the earth occupies relative to the sun. From the foregoing description it is seen that when the telescope is directed directly toward the sun the pointer indicates the longitude location of the instrument on the earth. It will be noted that the accuracy of the instrument is dependent upon the clock holding the telescope in the proper position relative to the globe. It will be further noted that since the telescope is positioned by the clock mechanism according to mean solar time, and since the sun's actual position varies from mean solar time by as much as six minutes, this variation being known as the equation of time, which corresponds to six nautical miles, it is necessary to correct the longitude reading according to the equation of time as given in the nautical almanacs.

Although the operation of the instrument in determining latitude and longitude have been described as separate operations, it should be noted that in actual use these operations are carried on simultaneously. This simultaneous operation is an automatic and necessary process since the polar axis of the instrument must be parallel with the polar axis of the earth, which gives the latitude reading before the telescope will follow the sun when rotated by the clock mechanism, and since the telescope must be rotated about the polar axis of the instrument before it can point toward the sun, which gives the longitude reading, it is necessary that both processes be performed simultaneously before the sun's rays will pass longitudinally through the telescope.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a device of the class described, a globe, a clock mechanism carried by said globe, a telescope adjacent the surface of said globe, means carrying said telescope and controlled by said clockwork whereby the telescope is moved about the globe by said clock mechanism.

2. In a device of the class described, a globe having a polar axis extending diametrically therethrough, a clock mechanism carried by said globe, a dial forming the equator of said globe and movable by said clock mechanism at the rate of one revolution every twenty-four hours, an arcuate band spaced from said globe and carried by said dial, and a telescope carried by and slidably positioned on said band.

3. In a device of the class described, a globe having a polar axis extending diametrically therethrough, a clock mechanism carried by said globe, a dial forming the equator of said globe and movable by said clock mechanism, an arcuate band extending with its plane normal to the plane of the equator of said globe and spaced from said globe, said arcuate band being carried by said dial, said arcuate band being graduated into degrees, a telescope carried by and slidably positioned on said band, said telescope being positioned on said band in accordance with the sun's declination.

4. In a device of the class described, a globe having latitude and longitude graduations thereon and having a polar axis extending diametrically thereto, a clock mechanism carried by said globe, a dial forming the equator of said globe and movable by said clock mechanism at the rate of one revolution every twenty-four hours, an arcuate band extending with its plane normal to the plane of the equator of said globe and spaced from said globe, said arcuate band being carried by said dial, said arcuate band being graduated into degrees, a telescope carried by and slidably positioned on said band, said telescope being positioned on said band in accordance with the sun's declination, and indicator means in association with said globe adapted to indicate the point on said globe vertically above the center thereof.

5. In a device of the class described, a base having a yoke portion thereon, an arcuate member supported by said yoke and slidable circumferentially relative thereto, a globe rotatably supported by said arcuate member on its polar axis, a clock mechanism carried by said globe and rotatable therewith, a dial forming the equator of said globe and rotatable with respect thereto by said clock mechanism, an arcuate band carried by said dial, a telescope carried by and slidably positioned on said band, the arcuate member having a latitude scale thereon, and indicator means on said base adapted to register with said latitude scale.

6. In a device of the class described, a base having a yoke portion thereon, an arcuate member supported by said yoke and slidable circumferentially relative thereto, a globe rotatably supported by said arcuate member on its polar axis, a clock mechanism carried by said globe and rotatable therewith, a dial forming the equator of said globe and rotatable with respect to said globe by said clock mechanism, said globe being provided with degrees of longitude graduated adjacent said dial, an arcuate band carried by said dial, a telescope carried by and slidably positioned on said arcuate band, a pointer carried by said arcuate member and extending circumferentially over said globe, the extended end of said pointer indicating the degrees of longitude.

7. In a device of the class described, a base having a yoke portion thereon, an arcuate member supported by said yoke and slidable circumferentially relative thereto, a globe having latitude and longitude lines thereon rotatably supported by said arcuate member on its polar axis, a clock mechanism carried by said globe and rotatable therewith, a pair of dials positioned adjacent each other forming the equator of said globe and rotatable with respect to said globe by said clock mechanism, said globe being provided with degrees of longitude graduated adjacent said dial, an arcuate band carried by one of said dials and extending with its longitudinal axis normal to the equator of said globe, said arcuate band being graduated into degrees, a telescope carried by and slidably positioned on said arcuate band, micrometer means in association with said telescope for accurately positioning said telescope on said arcuate band, the said arcuate member having a latitude scale thereon graduating in degrees symmetrically on each side of the zero point, indicator means on said base adapted to register with said graduations, and micrometer means in association with said arcuate member to facilitate more accurate readings of the position thereof, a pointer carried by said arcuate member and extending circumferentially over said globe, the extended end of said pointer indicating degrees of longitude, and micrometer means in association with said globe for more accurately reading degrees of longitude, and a second pointer carried by said globe, the extended end of said second pointer indicating the point of the globe vertically above the center thereof.

8. In a device of the class described, a globe, a clock mechanism carried by said globe, a telescope adjacent the surface of said globe, and movable with respect to said globe by said clock mechanism, means in association with said telescope for positioning said telescope in accordance with the sun's declination, and means carried by said telescope indicating points of sunrise and sunset.

9. In a device of the class described, a globe, a clock mechanism carried by said globe, a telescope adjacent the surface of said globe and movable with respect to said globe by said clock mechanism, means in association with said telescope for positioning said telescope in accordance with the sun's declination, a pair of semi-circular bands carried by said telescope, said semi-circular bands being positioned diametrically opposite each other, said band determining a plane perpendicular to the longitudinal axis of said telescope and passing through the center of said globe.

10. In a device of the class described, a globe, a clock mechanism carried by said globe, a telescope adjacent the surface of said globe and movable with respect to said globe by said clock mechanism, means in association with said telescope for positioning said telescope in accordance with the sun's declination, a semi-circular band carried by said telescope, secondary semi-circular bands rigidly supported at the extended ends of said first semi-circular band, said second semi-circular bands being provided with longitudinally extending slots, said longitudinally extending slots determining a plane perpendicular to the longitudinal axis of the telescope and passing through the center of the globe.

11. In a device of the class described, a globe, a clock mechanism carried by said globe, a telescope adjacent the surface of said globe, means carrying said telescope and controlled by said clockwork whereby the telescope is moved about the globe by said clock mechanism, and said carrying means including means for positioning said telescope relative to the globe in accordance with the sun's declination.

12. In a device of the class described, a globe, a clock mechanism carried by said globe, a telescope adjacent the surface of said globe, means carrying said telescope and controlled by said clockwork whereby the telescope is moved about the globe by said clock mechanism, said carrying means including means for positioning the telescope with respect to the globe in accordance with the sun's declination, and indicator means in association with said globe for indicating the point on said globe vertically above the center thereof.

13. In a device of the class described, a globe, a clock mechanism positioned within said globe, a telescope, means for supporting said telescope so as to be movable by said clock mechanism adjacent the surface of said globe and pointing toward said globe, said telescope being provided with cross hairs, said means being adjustable for positioning said telescope relative to the globe in accordance with the sun's declination.

14. In a device of the class described, a globe, a clock mechanism positioned within said globe, a telescope, means for supporting said telescope so as to be movable by said clock mechanism adjacent the surface of said globe and pointing toward said globe, said telescope being provided with cross hairs, said means being adjustable for positioning said telescope relative to the globe in accordance with the sun's declination, and a pair of semi-circular bands carried by said telescope and extending part way around said globe.

ERNEST H. ASHLOCK.